United States Patent [19]

Klintenstedt et al.

[11] Patent Number: 4,800,367

[45] Date of Patent: Jan. 24, 1989

[54] METHOD OF SENSING AND INDICATING ERRORS IN A DOSING CIRCUIT

[75] Inventors: Kjell Klintenstedt, Saltsjö-Boo; Christer Lantz, Stocksund, both of Sweden

[73] Assignee: Alfa-Laval Separation AB, Tumba, Sweden

[21] Appl. No.: 79,771

[22] PCT Filed: Dec. 12, 1986

[86] PCT No.: PCT/SE86/00570

§ 371 Date: Jul. 23, 1987

§ 102(e) Date: Jul. 23, 1987

[87] PCT Pub. No.: WO87/03667

PCT Pub. Date: Jun. 18, 1987

[30] Foreign Application Priority Data

Dec. 13, 1985 [SE] Sweden .................. 85058980

[51] Int. Cl.⁴ .............................................. G01F 15/00
[52] U.S. Cl. ................................... 340/526; 73/865.9;
73/866.2; 340/626; 340/679; 184/6.4;
137/552.7; 137/557
[58] Field of Search .................. 340/679, 626, 526;
137/552.7, 557, 551, 552; 73/866.2, 865.9;
184/6.4; 222/23, 71, 25, 27, 29

[56] References Cited

U.S. PATENT DOCUMENTS

| 1,584,863 | 5/1926 | Josephson . | |
|---|---|---|---|
| 1,707,993 | 4/1927 | Piquerez | 184/85 |
| 3,976,989 | 8/1976 | Smith | 137/552.7 X |
| 4,613,074 | 9/1986 | Schulze | 137/557 X |
| 4,662,540 | 5/1987 | Schroter | 137/557 X |

FOREIGN PATENT DOCUMENTS

| 2716559 | 10/1977 | Fed. Rep. of Germany . |
| 3103981 | 9/1982 | Fed. Rep. of Germany . |
| 2403512 | 4/1979 | France . |
| 371878 | 12/1974 | Sweden . |
| 412220 | 2/1980 | Sweden . |

Primary Examiner—Tom Noland
Attorney, Agent, or Firm—Davis, Hoxie, Faithfull & Hapgood

[57] ABSTRACT

The present invention concerns a method of sensing and indicating errors in a dosing circuit, in which a pumping device (1) pumps a fluid via a conduit system out to at least one dosing device (3) located nearby a dosing place. The dosing device (3) measures and discharges intermittently a predetermined volume of the fluid through a pressure controlled non-return valve (16) to the dosing place, when the pressure in the conduit system is increased from a low pressure to a high pressure during a certain limited time. The invention is characterized in that an error in the dosing circuit is sensed and indicated by measuring the pressure in the dosing chamber (11) and the time from a chosen reference time during a dosing cycle, that a checking is made continuously or intermittently that a combination of simultaneously measured valves of pressure and time is kept within predetermined limits for such a combination, an error being sensed and a signal being emitted when the combination of the measured values is not kept within such limits.

11 Claims, 2 Drawing Sheets

METHOD OF SENSING AND INDICATING ERRORS IN A DOSING CIRCUIT

BACKGROUND OF THE INVENTION

1. Field of the Invention

The present invention concerns a method of sensing and indicating errors in a dosing circuit, in which a pumping device pumps a fluid via a conduit system out to at least one dosing device located nearby a dosing place. This dosing device measures and discharges intermittently a pre-determined volume of the fluid through a non-return valve out to the dosing place, when the pressure in the conduit system is increased from a low pressure to a high pressure during a certain limited time. A dosing device of this kind comprises an inlet and an outlet for the fluid, a charging chamber connected to said inlet, a dosing chamber connected to said outlet, a closable passage connecting the chambers and a movable body, which on one of its sides is subjected to the pressure in the charging chamber and on its opposite side is subjected to the pressure in the dosing chamber. Upon increase of the pressure in the conduit system to said high pressure the movable body moves in a way such that the volume of the dosing chamber decreases and the volume of the charging chamber increases, during which movement the passage between the chambers is closed, whereby fluid is discharged out of the dosing chamber through said outlet and non-return valve to the relevant dosing place and fluid is flowing into the charging chamber from the conduit system. Upon decrease of the pressure in the conduit system to said low pressure, the movable body moves in the opposite direction by the force of a resetting device, thereby pressing the fluid located in the charging chamber through said passage to the dosing chamber. A valve is arranged to prevent outflow through the inlet.

2. Description of Related Art

Dosing circuits of this kind exist in many applications. Often the dosing is of crucial importance for a process or a machine to operate in a satisfactory manner. Therefore, these dosing circuits usually are provided with equipment for sensing of errors in the dosing circuit.

Common to hitherto known equipment for sensing of errors in dosing circuits is that it does not give a reliable sensing of errors for all types of errors, which can occur in the circuit. Usually, the condition in the dosing circuit is sensed via a parameter, which is not representative for the condition at the very dosing place but for the condition in the central parts of the dosing circuit.

One example of an application, in which a reliable sensing of errors in the dosing circuit is of great importance, is lubrication of various machine elements such as bearings. The endurance of a bearing is reduced considerably if lubrication of it can not keep the friction and the heat generation caused thereby at a low level.

In hitherto known lubrication devices checking that lubrication is performed satisfactorily is made by inspection through sight glasses, by measuring of the lubricant level in a lubricant tank or by measuring of the pressure in a closed or open lubricant circuit, which continuously or intermittently provides the machine element with a lubricant by spraying or dosing of a predetermined volume of the lubricant.

In the Swedish patent publication 7214186-4 (publication No. 371 878) there is shown a distribution plant for lubricant, in which an error is indicated by a leakage flow, which directly or indirectly is caused by the error. In the known equipment the total flow of the lubricant in a main conduit is distributed out through a number of branch conduits. Each one of these provides a lubrication place with lubricant via two flow regulating inserts connected in series. An error in the lubricant circuit causes changes in the flow through the inserts, which in turn causes the pressure in a conduit between the inserts to vary. When the pressure in said conduit differs from a predetermined interval, a valve is opened to let out of the main conduit the leakage flow indicating the error.

The supply of lubricant to a bearing is often dimensioned in a way such that the lubricant also can carry away the heat generated in or transferred to the bearing by heat conduction. However, if a bearing is charged with more lubricant than is needed to maintain an oil film having enough carrying capacity, the friction losses and, thus, the heat generation in the bearing will increase. At high rotational speeds in bearings it is thus desirable to keep the supply of lubricant at a level as low as possible without risking the carrying capacity of the oil film. However, this means a reduced margin in the supply of lubricant, which in turn results in increasing risks and consequently higher demands on a rapid and reliable sensing of all errors crucial for the maintenance of the lubrication function.

Bearings in high speed rotating machines, such as centrifugal separators, often need a very small flow of lubricant, whereby they become sensitive to variation in the flow of lubricant. Therefore, clogging of a channel for the lubricant or admixture of air in the lubricant means great risks for the operation of these machines.

SUMMARY OF THE INVENTION

The object of the present invention is to provide a method of sensing errors in a dosing circuit, which method removes the above mentioned problems and can give a quick and reliable indication of errors for all types of errors which may appear in the dosing circuit.

Another object is to provide equipment for indication of errors, which can indicate errors even upon dosing of small volumes of a fluid.

By the present invention a method is suggested, which makes it possible to achieve said objects. This is possible in a way such that the pressure is measured in a well confined space, which is located nearby the dosing place and is constituted by the dosing chamber and channels connected thereto between the same and the non-return valve, that the time is measured from a chosen reference time during a dosing cycle and that at least at certain occasions checking is made that a combination of simultaneously measured values of pressure and time is kept within predetermined limits for such a combination, an error in the circuit being sensed and a signal being emitted when the combination of measured values is not kept within said limits.

By this method it is possible to sense errors, the cause of which can be found before as well as after the dosing chamber seen in the direction of the flow.

In a preferred performance of the method checking that the combination of measured pressure and time values is kept within predetermined limits is performed intermittently at a number of occasions during a dosing cycle. At least one of these occasions should take place upon increasing pressure and at least one upon decreasing pressure in the dosing chamber. Initiation of the intermittently performed checking is made either when a predetermined pressure or a predetermined time has been measured, a signal indicating error being emitted if the value of the other parameter (time or pressure, respectively) measured at the same time is not kept within predetermined limits. The number of checking occasions and at which values the checking shall be initiated are chosen in such a way that all errors which are harmful to the function can be sensed and that the phase of the dosing cycle, during which the checking is performed, can be confirmed in a reliable way. The pressure is measured by means of a pressure sensing device emitting a signal analogous to the pressure or by means of at least one pressure sensing device which closes or opens an electric circuit at predetermined pressure values.

In a different performance of the method the time differential of the pressure is also sensed and is used for the confirmation of the phase in the dosing cycle during which the checking is performed. According to a further modification of the method the signal emitted upon an error contains information about which occasion the checking is performed and which predetermined limit has been exceeded by the measured combination. The emitted signal then may also contain information about and define a time differential measured as above. If the pressure sensing device is of the kind closing and opening an electric circuit, the latter information only indicates the sign of the time differential. The condition of the electrical circuit comprising the pressure sensing device which sensed the latest change, i.e. closed or open, then indicates the sign of the differential.

BRIEF DESCRIPTION OF THE DRAWINGS

In the following the method according to the invention will be described in more detail applied in a lubrication circuit with reference to the accompanying drawing, in which FIG. 1 schematically shows a lubrication circuit, provided with an equipment for carrying out the method according to the invention.

Figure 1:
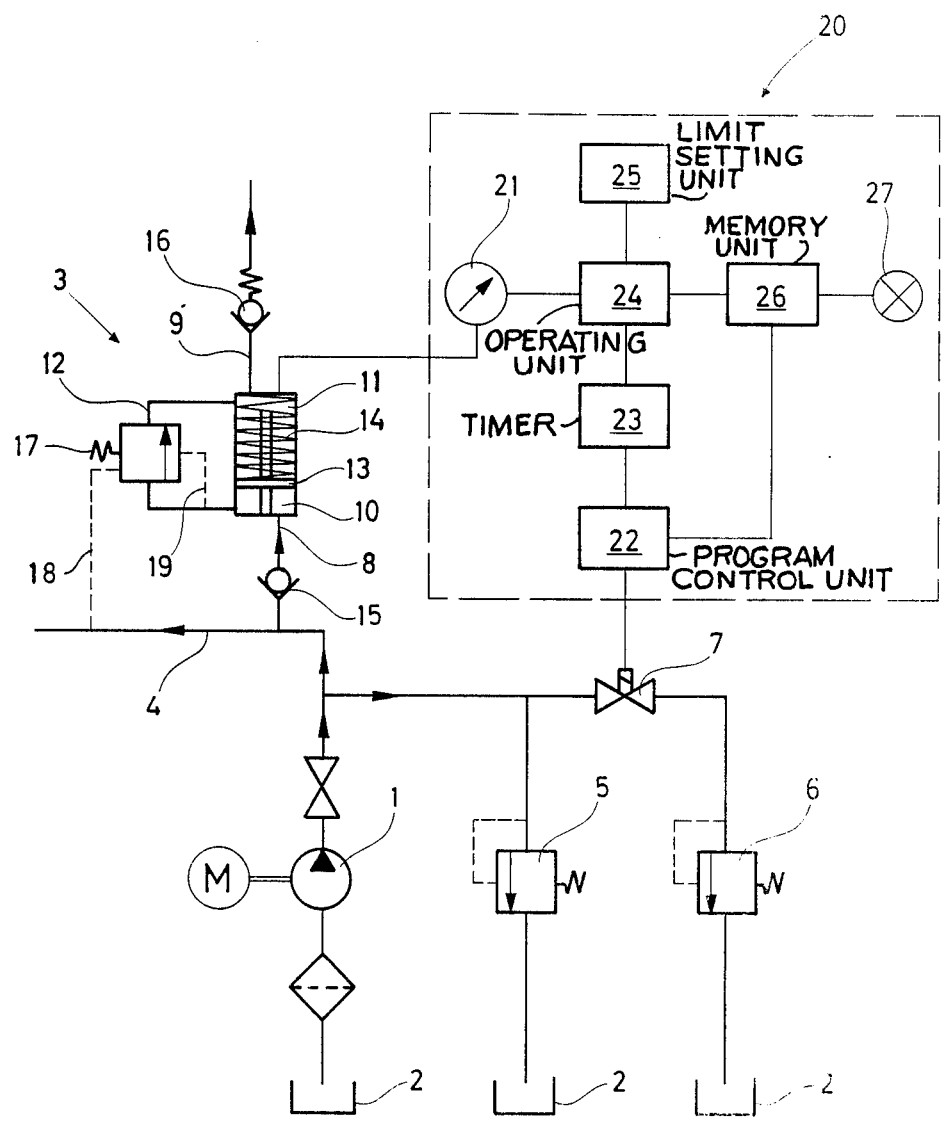

The lubrication circuit shown in FIG. 1 comprises a pumping device 1, which pumps lubricant from a lubricant tank 2 via one or more dosing devices 3 (only one is shown), which measure a predetermined amount of lubricant out to a lubrication place, not shown. A conduit 4, through which lubricant is supplied to the dosing device 3 from the pumping device 1, is also connected to the lubricant tank 2 via two overflow valves 5 and 6. One overflow valve 6 opens for overflowing to the lubricant tank 2, when the pressure at its inlet exceeds a relatively low value. The connection between this valve 6 and the conduit 4 can be opened or shut by means of a valve 7. The other overflow valve 5 opens at a higher pressure. Which one of the overflow valves, which is limiting the pressure in the conduit 4 is controlled by a program control 22, which at predetermined intervals closes the valve 7, and keeps the same closed during a time which also is pre-determined, the lubrication time. When the valve 7 is open the pressure in the conduit 4 is limited by the pressure at which the overflow valve 6 opens the connection to the lubricant tank 2. When the program control 22 closes the valve 7, the pressure in the conduit 4 increases to the pressure at which the overflow valve 5 opens the connection to the lubricant tank 2.

The dosing device 3 has an inlet 8, an outlet 9, a charging chamber 10 connected to said inlet 8, a dosing chamber 11 connected to said outlet 9, a closable passage 12 connecting the chambers and a movable body 13. The movable body 13 is on its one side subjected to the pressure in the charging chamber 10 and on its opposite side subjected to the pressure in the dosing chamber 11 and the force of a resetting device 14. At the inlet and outlet of the dosing device non-return valves 15, 16, respectively, are arranged. The non-return valve 16 opens at the outlet 9 a connection between the outlet and a not shown place for the lubrication when the pressure at its inlet side exceeds a predetermined value. The closable passage 12 shown as an example is influenced in closing direction partly by a spring 17, partly by the pressure in the conduit 4 via a control conduit 18 and in opening direction by the pressure in the charging chamber 10 via a control conduit 19.

To the shown lubrication circuit equipment 20 for the control and the checking of the lubrication function is arranged.

The shown equipment 20 consists of a pressure sensor 21, for instance a piezoelectric sensor working analogously or a pressure sensing contact breaker working in a digital manner, which measures the pressure in the dosing chamber 11, a program control 22, which as described above controls the valve 7, a time measuring device 23, an operating unit 24, which deals with the simultaneously measured pressure and time values and received to the same, a unit 25 for the limit values, for setting of the predetermined limits for the combinations of pressure and time values, within which the lubrication function is maintained faultlessly, a memory 26 and an indicating means 27. The units 22–27 included in the equipment 20 can advantageously be built together, but have in the following been kept separately for the purpose of clarity.

Upon executing the method according to the invention the shown lubricant circuit and the equipment connected thereto operate according to the following.

The pump 1 pumps lubricant from the lubricant tank 2 to the conduit 4. The pressure in the conduit 4 is controlled by a program control 22, which opens and closes the valve 7 according to a predetermined program. Alternatively the pressure in the conduit 4 can be controlled by a measured parameter, for instance a temperature, which indicates if there is a need of lubrication. When the valve 7 is open, the pressure in the conduit 4 is kept at a relatively low value, a low pressure. The overflow valve 6 then opens a connection between the conduit 4 and the lubricant tank 2 at the low pressure level and keeps the pressure at this level. When low pressure is prevailing in the conduit 4, low pressure also is prevailing in the charging chamber 10. The moveable body 13 is then kept pressed towards its end position closest to the inlet 8 by the resetting device 14, which acts on the body 13 with a force exceeding the resulting force on this from the low pressure in the charging chamber 10. The passage 12 is then kept closed by the spring 17 because of the fact that the pressure in the two control conduits 18 and 19 is equal. The pressure in the dosing chamber 11 is then also at a low level, whereby the non-return valve 16 keeps the outlet 9 closed.

When the dosing device 3 is to measure and discharge the predetermined volume of lubricant to the lubrication place this is initiated by the program control 22, which closes the valve 7. Hereby the pressure in the conduit 4 increases to the pressure, high pressure, at which the overflow valve 5 opens for a return flow to the lubricant tank 2. At the same time as this the pressure in the charging chamber 10 also increases, which acts on the movable body 13. During this process the passage 12 is still closed. When the force resulting from the pressure in the chamber 10 acting on the movable body 13 is able to overcome the force of the resetting device 14 and the force of the pressure in the dosing chamber 11, the body 13 starts to move so that the volume of the dosing chamber 11 decreases. The pressure in the dosing chamber 11 then increases to a value at which the pressure controlled non-return valve 16 in the outlet 9 opens, in a way such that lubricant in the dosing chamber 11 can flow out to the lubrication place. The body 13 is moving until it reaches an end position, while it discharges a predetermined volume of lubricant. When the body 13 has reached the end position, the pressure in the dosing chamber 11 decreases to the pressure at which the non-return valve 16 closes.

The program control 22 keeps the valve 7 closed during as long a predetermined time, lubrication time, as needed for the movable body 13 to reach the end position for certainty and to discharge the whole amount of lubricant present in the dosing chamber 11. The program control 22 then opens the valve 7 again. The pressure in the conduit 4 will then be acting on the overflow valve 6, which opens for a flow out of the conduit 4 to the lubricant tank 2. Hereby the pressure in the conduit 4 and thus also the pressure in the charging chamber 10 decreases to the pressure, low pressure, at which the overflow valve 6 closes again.

When the pressure in the charging chamber 10 has decreased below a certain value, the movable body 13 is pressed by the resetting device 14 in a direction towards the inlet 8. The non-return valve 15 is then preventing the lubricant present in the charging chamber 10 from flowing out into the conduit 4. The increasing pressure in the charging chamber 10 and in the control conduit 19 is almost immediately capable to open the passage 12, whereas it quickly exceeds the pressure prevailing in the conduit 4. The reason why the passage 12 is opened is that the pressure in the charging chamber 10 acts with a force on the switch in the passage 12 (via the control conduit 19), which exceeds the sum of the forces on this caused by the spring 17 and the pressure in the conduit 4 (via the control conduit 18). While the movable body 13 is moving, lubricant existing in the charging chamber 10 is pressed through the passage 12 into the dosing chamber 11.

The program control 22 keeps the valve 7 open during a predetermined time, after which it closes the valve 7 again and the dosing cycle is repeated. The interval between these dosing cycles is then adjusted such that a sufficient number of doses is discharged per time unit of the predetermined volume of lubricant for the ensurance of lubrication of the lubrication place in question.

The lubrication procedure described above is controlled and checked by means of the equipment 20. The pressure measuring device or devices 21 included in this and the time measuring device 23 emit a signal, responding to respective parameters, to an operating unit 24. The time is measured directly or sequentially from a chosen reference time during a dosing cycle. As reference time is then advantageously the time chosen at which the program control 22 closes the valve 7, or the time at which a predetermined minor increase of the pressure in the dosing chamber 11 has been possible to be measured by the pressure sensing device 21 after the valve 7 has been closed.

To the operating unit 24 a unit 25 for the limit values also is connected, in which predetermined limits for a pressure/time combination can be set, within which the lubrication circuit in question operates faultlessly. If the time is used as reference, at which said increase of the pressure is measured, also a maximum time is suitably set in the unit 25 for the limit value, within which said increase must have been measured by the pressure sensing device 21.

The operating unit 24 compares the combination of the measured values with the limits set in the unit 25 for the limit values for a pressure/time combination and emits a signal as soon as the combination of measured values is not kept within these limits. The signal emitted in this way indicates that an error is present in the lubrication circuit or that a disturbance is at hand, which might result in such an error. To facilitate the revealing of an error in the lubricant circuit, which has caused the operative unit to emit a signal, the emitted signal contains information about the phase in the dosing cycle, during which the error has happened and about the limit value, which has been passed below or exceeded. This information can be read on the indicator 27.

The time course of the pressure in the dosing chamber 11 often can vary and a limit be passed below or be exceeded and an occasional signal be emitted without an error being present. If on the other hand an identical signal is received during two or more consecutive dosing cycles, there is a great risk that an error is present. In order to have the indicator 27 not to indicate errors for occasional variations, the memory 26 of the equipment 20 is arranged to store the signal or the signals given by the operative unit 24 during the last preceding dosing cycles.

Figure 2:
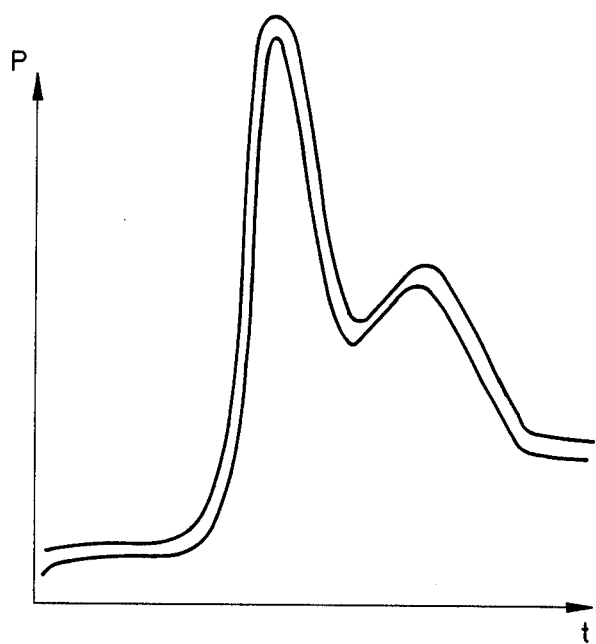
FIG. 2 shows a pressure/time diagram with two limit curves.

Of course, the equipment 20 can be designed such that it senses and indicates errors in the lubrication circuit continuously and/or intermittently. The choice of design in this respect is mainly determined by the working manner of the lubrication circuit, the pressure changes in the dosing chamber occurring during a dosing cycle, and the demands put for the lubrication to be satisfactory. An example of how the pressure in the dosing chamber 11 can be varying during a dosing cycle is illustrated in FIG. 2 showing two limit curves for the pressure in the dosing chamber as a function of the time. These curves are found experimentally for a certain lubrication circuit. If the pressure is kept between these limit curves, the lubrication circuit operates faultlessly. The limit curves are then taking care of the specific properties of the lubrication circuit, wanted as well as not wanted. The pressure can, as shown in FIG. 2, show an increase at closing of the non-return valve 16, which is not wanted but it is not harmful for the function of the lubrication circuit. If the checking is executed intermittently, it either can be initiated at predetermined moments during a dosing cycle or when predetermined pressure values have been measured. If the control is initiated at predetermined moments, it is checked that the measured pressure at such a moment is kept within the predetermined limits applicable for the moment in question. If the checking is initiated when predetermined pressure values have been measured, it is checked that the time measured at the same time is kept within the predetermined limits applicable at this checking occasion.

The choice of parameter for initiating a checking and at which moments a checking shall be made is also determined by the pressure changes in the dosing chamber. Often only small amounts of lubricants are discharged during a dosing cycle, the pressure being increasing and decreasing during a very short time interval. The checking in these applications becomes more reliable if it is initiated when certain pessure values are being measured. This because of the fact that relatively reliable limits for the other parameter, the time, hereby can be defined. In many cases it is enough to have the checking executed at four occasions during a dosing cycle, two upon increasing pressure and two upon decreasing pressure, in which case it is enough to have two pressure sensing devices of the kind that close and open an electric circuit at predetermined pressure values. If the checking is made intermittently at predetermined occasions during a dosing cycle, there is no need to define limit values for the whole dosing cycle but only the limit values applicable at these moments.

By sensing and indicating errors in a dosing circuit in this manner a quick and reliable revealing of occurring errors also can be obtained upon dosing small amounts of a fluid.

By measuring the pressure in a chamber having only a small confined volume in close vicinity to the place for the dosing, a parameter is obtained, which is representative of the conditions at the dosing place and not sensitive for, inter alia, the elasticity of the system.

The method described above can, within the scope of the following claims, be modified and completed with other error sensing measurements, such as measurement of temperature for instance.

We claim:

1. Method of sensing and indicating errors in a dosing circuit, in which a pumping device (1) pumps fluid via a conduit system (4) out to at least one dosing device (3) located nearby a dosing place, which measures and discharges intermittently a predetermined volume of the fluid through a pressure controlled non-return valve (16) out to the dosing place when the pressure in the conduit system (4) is increased from a low pressure to a high pressure during a certain limited time, the dosing device (3) comprising an inlet and an outlet (8, 9, respectively) for the fluid, a charging chamber (10) connected to said inlet (8), a dosing chamber (11) connected to said outlet (9), a closable passage (12) connecting the chambers and a moveable body (13), which on one side thereof is subjected to the pressure in the charging chamber (10) and on an opposite side thereof is subjected to the pressure in the dosing chamber (11) and upon an increase of the pressure in the conduit system (4) to said high pressure moves in a way such that the volume of the dosing chamber (11) decreases and the volume of the charging chamber (10) increases, during which moment the passage (12) between the chambers (10, 11) is closed, whereby the fluid is discharged out of the dosing chamber (11) through said outlet (9) and non-return valve (16) to the dosing place and fluid flows into the charging chamber (10) from the conduit system (4), said moveable body (13) being moving in an opposite direction upon a decrease of the pressure in the conduit system (4) to said low pressure by the force of a resetting device (14), thereby pressing any fluid located in the charging chamber (10) through said passage (12) into the dosing chamber (11), and a valve (15) being arranged to prevent outflow through the inlet, characterized in that an error in the dosing circuit is sensed and indicated by:
   (a) measuring the pressure in the dosing chamber (11) and channels between the same and non-return valve (16) connected thereto,
   (b) measuring the time at least while the dosing is taking place, from a chosen reference time during a dosing cycle,
   (c) checking that a combination of simultaneously measured values of pressure and time is kept within predetermined limits for such a combination, and
   (d) emitting a signal when the combination of measured values is not kept within said limits.

2. Method according to claim 1, characterized in that said checking is performed intermittently.

3. Method according to claim 2, characterized in that said checking is initiated when a predetermined pressure value is measured and that a signal is emitted if the time measured simultaneously is not kept within predetermined limits.

4. Method according to claim 1, characterized in that said checking is performed intermittently at a number of occasions during the dosing cycle, of which occasions at least one takes place upon increasing pressure and at least one takes place upon decreasing pressure in the dosing chamber (11).

5. Method according to claim 1, characterized in that said checking is initiated when a predetermined time value is measured and that a signal is emitted if the pressure measured simultaneously is not kept within predetermined limits.

6. Method according to claim 1, characterized in that the time differential of the pressure is sensed and that the sensed time differential is used to confirm the phase of the dosing cycle during which said checking is performed.

7. Method according to claim 1, characterized in that the time differential of the pressure is sensed and that sensed time differential is indicated by means of said emitted signal.

8. Method according to claim 1, characterized in that the occasion at which said checking is performed and the predetermined limit passed by the measured combination is indicated by means of said signal.

9. Method according to claim 8, characterized in that said signal is stored during a number of dosing cycles and that an error is not indicated until the same signal is emitted during at least two consecutive dosing cycles.

10. A method according to claim 1 in which the circuit is a lubrication circuit.

11. A method according to claim 10 wherein the circuit is a lubrication circuit for the lubrication of bearings in a rotating machine.

* * * * *